United States Patent Office 2,732,691
Patented Jan. 31, 1956

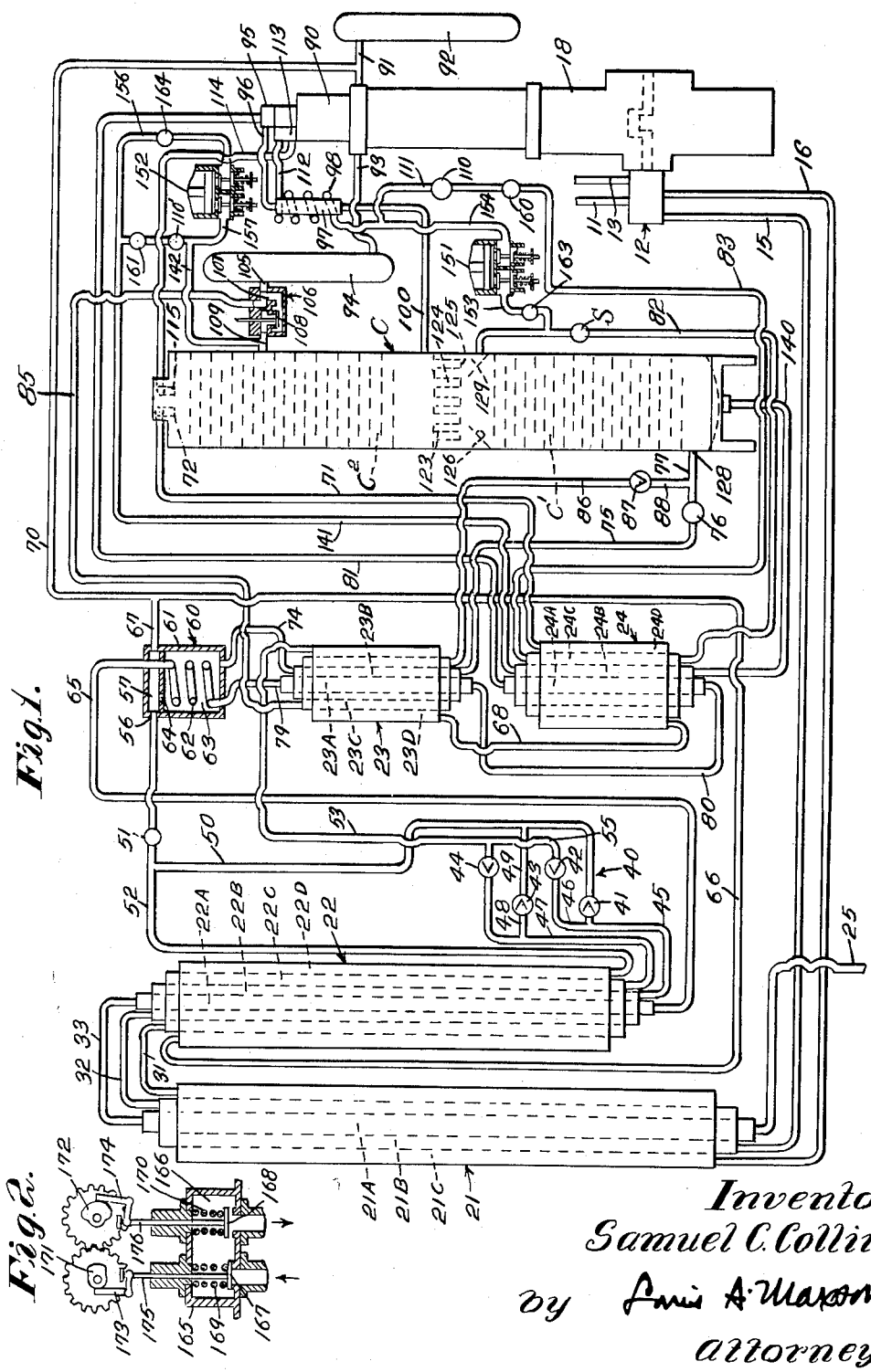
Jan. 31, 1956    S. C. COLLINS    2,732,691
APPARATUS FOR TREATING GASES
Filed Oct. 1, 1953
Inventor:
Samuel C. Collins.
by Louis A. Maxson
Attorney.

2,732,691

APPARATUS FOR TREATING GASES

Samuel C. Collins, Watertown, Mass., assignor to Joy Manufacturing Company, Pittsburgh, Pa., a corporation of Pennsylvania Application October 1, 1953, Serial No. 383,435

5 Claims. (Cl. 62—123)

This invention relates to improvements in apparatus for treating gases.

It will herein be described particularly in its application to the production of substantially pure oxygen from air, but this is but illustrative, because the apparatus disclosed may be used, with appropriate adaptations, with various gases to be processed, to produce various particularly desired products which are constituents of the gases to be treated.

It will moreover be described in connection with an apparatus for the production of substantially pure oxygen from atmospheric air by a method which is described and claimed in my copending application Serial No. 122,077, filed October 18, 1949, of which case this is a continuation-in-part, and also in my copending application Serial No. 81,589, filed March 15, 1949, of which application this present application is a continuation-in-part. Said copending applications Serial Nos. 122,077 and 81,589 are now abandoned.

It is a primary object of the invention to provide an improved generating apparatus in which, through the use of metering devices of appropriate fixed displacement or other suitable dispensing devices, a close control of the process of oxygen generation may be effected. Other objects and advantages of the invention will hereinafter appear.

In the accompanying drawing, in which one embodiment of the invention, and a modification of the latter, are shown for purposes of illustration, Fig. 1 is a diagrammatic view of a double column apparatus, employing fixed displacement metering means analogous to pumps to control the process of generation; and Fig. 2 is a fragmentary sectional view through a form of dispensing device which may be used in the place of a metering device, such as is shown in Fig. 1.

Referring first to Fig. 1, air at a suitable temperature and pressure may be delivered, as from a suitable air compressor (not shown), through a conduit 11 to a valve mechanism generally designated 12, and the effluent (mainly nitrogen) leaving the apparatus may be discharged to the atmosphere through a conduit 13. The valve mechanism 12 is of the mechanically actuated type, and is periodically moved by power, and with a snap action, to reverse the connections of the conduits 11 and 13 with a pair of conduits 15 and 16 which lead from the casing of the valve mechanism 12. In my copending application, Serial No. 661,253, filed April 11, 1946, which has matured into Patent No. 2,716,333 granted August 30, 1955, there is diagrammatically shown a reversing valve mechanism suitable for the performance of the functions of the valve mechanism 12; and an example of other mechanisms suitable for this purpose formed the subject matter of an application of Win W. Paget, Serial No. 35,092, which was filed June 25, 1948, and has matured into Patent No 2,638,923. The power for shifting the valve mechanism 12, to effect connection of the air supply conduit 11 now with the conduit 15 and again with the conduit 16, and connection of the conduit 13 with the conduits 16 and 15 while the conduit 11 is connected with the conduits 15 and 16, may be taken from any suitable source, but is desirably taken from the drive shaft of an expansion engine 18, through any suitable reducing gearing such as that which is diagrammatically illustrated in said Collins Patent No. 2,716,333 granted upon application Serial No. 661,253. Reversals are adapted to be effected at relatively short intervals; and suitable intervals may be on the order of three minutes.

Heat exchangers 21 and 22, desirably vertically disposed, and formed as separate units, instead of as one longer unit, in order to keep height within desirable limits, are arranged in series, and entering air passes through the heat exchangers 21 and 22 in the order mentioned, while leaving nitrogen passes through these same heat exchangers in the order 22, 21. Heat exchanger 21 has three courses, illustrated as coaxial courses 21A, 21B, and 21C, the first the innermost course and the last the outermost; and exchanger 22 is shown as having similarly relatively arranged courses 22A, 22B, and 22C and, outside 22C, a fourth course 22D. Through two of the courses in series in the exchangers 21 and 22, to wit, courses 21B, 22B and courses 21C, 22C, the entering air and the leaving nitrogen flow alternately, the entering air flowing inwardly through one or the other of these pairs of courses and the nitrogen flowing outwardly through the one of such pairs of courses not at any given moment serving for the inflow of the air. Through the third course, 21A, of the exchanger 21 and through the corresponding course, 22A, of the exchanger 22, but in the order 22A, 21A, the leaving oxygen product is discharged. Exchanger 22 has, as above noted, a fourth course 22D, through which a portion of the air which is entering the apparatus by way of the exchangers 21, 22 is caused to recirculate through exchanger 22, the better to effect the depositing out of impurities from the entering air stream and to increase the temperature of the air entering the expansion engine.

It has been noted, with respect to the exchangers 21 and 22, and it will be noted, with respect to further heat exchangers 23 and 24 hereinafter to be mentioned further, that the courses are indicated as being coaxial. It will, however, be appreciated that the precise form of construction of the exchangers is not illustrated in the diagram of Fig. 1, since suitable multiple pass exchangers may assume various forms, and, in the Samuel C. Collins Patent No. 2,716,333, a suitable form of exchanger is illustrated, and other possible types are illustrated in other applications of said Samuel C. Collins, Serial Nos. 3,217, filed January 20, 1948, and now Patent No. 2,596,008, and 2,877, filed January 17, 1948, and now Patent No. 2,611,586. Exchanger 23 will be observed to be of the four-course type, and exchanger 24 of the four-course type.

Conduit 15 communicates with course 21B of exchanger 21, and conduit 16 with course 21C of exchanger 21. The leaving oxygen product passes outwardly through course 21A of exchanger 21 and passes to a shop line, to a bank of cylinders, or to any other desired point or apparatus, for use or storage, through a conduit 25. Course 21C of exchanger 21 is connected by a conduit 31 with course 22C of exchanger 22. Course 21B of exchanger 21 is connected by a conduit 32 with course 22B of exchanger 22. A conduit 33 connects course 21A of exchanger 21 with the top of course 22A of exchanger 22. These courses are traversed serially, in the order 22A, 21A, by the oxygen product, as later described. It will be appreciated that air will flow alternately in through course 21C, conduit 31 and course 22C or course 21B, conduit 32 and course 22B, while concurrently nitrogen will flow outwardly through the ones of said courses and passages last mentioned not carrying the entering air.

A suitable automatic reversing valve mechanism, generally designated 40, is provided at the end of heat exchanger 22 last left by the entering air and first entered by the leaving nitrogen, this including four automatic check valves 41, 42, 43 and 44. This arrangement is disclosed in the Samuel C. Collins application Serial No. 661,253, now Patent No. 2,716,333. The lower end of course 22B has connected with it a conduit 45 which leads to the check valve 41, and a branch 46 leads from conduit 45 to check valve 42. A conduit 47 leads from course 22C to check valve 44, and a branch 48 connects conduit 47, at a point between course 22C and the check valve 44, with the check valve 43. A conduit 49 connects the other side of check valve 43 with a conduit 50 leading from the check valve 41 to a suitable restrictor device 51, which creates a slight difference between the pressure in the conduit 50 and the pressure beyond the device 51, the latter pressure being on the order of two pounds less than the pressure in conduit 50. A conduit 52 connects the conduit 50 with the bottom of course 22D. A conduit 53 leads from the side of check valve 44 opposite the conduit 47, to the outermost course of the heat exchanger 23. Nitrogen always flows outwardly through conduit 53. A conduit 55 connects the side of check valve 42 opposite the conduit 46 to the conduit 53. Each of the check valves 41, 42, 43 and 44 opens in the direction indicated by its > and prevents opposite flow.

The restrictor 51 is connected as at 56 to a chamber 57 within the top of an evaporator-condenser 60 having a suitably insulated casing 61 and having in said casing an oxygen conducting conduit or course 62 and an air conducting conduit or course 63 in close heat exchange relation with each other. The conduit or course 63 is connected at 64 by an opening with the chamber 57. The oxygen conduit or course 62 is connected by a conduit 65 with the bottom of course 22A of exchanger 22. The top of course 22D of exchanger 22 is connected by a conduit 66 with a conduit 67 leading from the chamber 57, and the reunited stream of air passes to a conduit 70, which leads to the expansion engine 18 later more fully described.

When the air entering the system is passing through course 22B, it flows past the check valve 41. When course 22B is serving for outflow of nitrogen, the nitrogen flows from conduit 53, through conduit 55 and past check valve 42 and through conduits 46 and 45 to course 22B. When course 22C is serving for inflow of air, the entering air flows past the check valve 43. When course 22C is being used to conduct leaving nitrogen, the nitrogen flows past check valve 44 and through conduit 47. As the entering air is at a much higher pressure than the leaving nitrogen, no check valve subjected on its discharge side to air can be opened by the lower nitrogen pressure.

The heat exchangers 23 and 24 have been previously mentioned. Exchanger 23 has four courses: a central one, 23A, a next course 23B, a third course 23C, and an outer course 23D surrounding, as shown on the drawing, course 23C. Obviously the arrangements of the courses, and the structure of this exchanger, are subject to wide structural variations. Exchanger 24 has a central course 24A, an outer course 24D and two intermediate courses 24B and 24C. It too is subject to wide structural variation. It will be understood that the several courses will be in good heat exchange relation with respect to each other.

It has been noted that the conduit 53 is connected with the outermost course 23D of exchanger 23. This connection is with the top of such course. The bottom of course 23D is connected by a conduit 68 with the bottom of course 24D of exchanger 24, and the top of course 24D is connected by a conduit 71 with the nitrogen outlet (the efflux connection) 72 of the low pressure section $C^2$ of a double column C later further described, but which it may here be noted comprises a high pressure section or chamber $C^1$ and a low pressure section or chamber $C^2$. The compressed air course 63 of evaporator-condenser 60 is connected by a conduit 74 with the top of course 23B of exchanger 23. The bottom of said course is connected by a conduit 75 with a valve device 76, which, in the particular apparatus shown, and when the latter is used for oxygen production, is adjusted to effect a pressure drop between its opposite sides on the order of 88 p. s. i. for a compressor delivery pressure of 160 p. s. i. This is substantially the same reduction in pressure as occurs in the expansion engine 18, when the latter is operating with its longer period of admission, hereinafter fully explained. The downstream side of valve device 76 is connected with a conduit 77 which leads to a point near the lower end of the high pressure section $C^1$ of the double column C. The central course 23A of exchanger 23 is connected at its top with a conduit 79 leading to the oxygen course 62 of the evaporator-condenser 60, while its bottom is connected with the bottom of central course 24A of exchanger 24 by a conduit 80. A conduit 81 leads from the top of the central course 24A. This is connected with the discharge of a liquid oxygen pump, later described. The high pressure section $C^1$ of the column C has a connection for the flow of nearly pure nitrogen via a conduit 82, with the course 24C of exchanger 24. The top of course 24C is connected with a conduit 83 whose function is later described.

Three of the four courses of exchanger 23 have been noted. The fourth course, 23C, is connected at its top with an expanded air conduit 85, and its lower end is connected by a conduit 86, containing a check valve 87 openable towards the conduit 77 and connected with the latter by a connection 88. The check valve opens towards the conduit 77, but only when the pressure in the conduit 86 is sufficient to effect opening of check valve 87 against the pressure in conduit 77.

The expansion engine 18, which may be of the construction shown in the Samuel C. Collins application Serial No. 665,206, filed April 26, 1946, and now Patent No. 2,607,322, provided with suitable means for predeterminedly lengthening and shortening the period of admission, or which may be of the character of the expansion engine employing cam follower rollers one or both of which coact with a cam depending on whether early or late cutoff is desired, which expansion engine is illustrated and described in an application of Win W. Paget, Serial No. 31,017, filed June 4, 1948, now Patent No. 2,678,028, granted May 11, 1954, or of other suitable construction, includes a cylinder 90 having admission and exhaust valves, not shown, and to the admission valve of which air under pressure is admitted from the conduit 70 through a conduit 91 with which an "In" surge tank 92 is connected so as to minimize fluctuations in flow. A discharge or exhaust connection 93 leads from the expansion engine to a "Discharge" surge tank 94, which may have associated with it a strainer to catch any snow that might otherwise attain to the column while the heat exchangers 21 and 22 were not fully cooled down during the starting of the apparatus. The expansion engine supports on the top of its cylinder a jacketed liquid oxygen pump 95 of any suitable construction, the liquid oxygen pump being for example actuated by the expansion engine piston as is the pump shown in the last above mentioned application of Win W. Paget which matured into Patent No. 2,678,028, or in any other suitable manner; and it may be noted that the conduit 81 is connected with the discharge of the liquid oxygen pump 95, while this pump has a suction connection 96 leading to it from a strainer 97 which is cooled or jacketed by liquid air, the jacket herein being represented by a coil 98. To the strainer 97 a conduit 100 leads from a point adjacent to the bottom of the low pressure section $C^2$ of the double column C, such point of connection at the desired liquid oxygen level in such low pressure section. The "Discharge" surge chamber 94 has connecting with it a conduit 105 which is connected to a valve structure 106, which valve structure includes a passage or chamber 107 continuously in communication with the conduit 85, and another chamber connectable through a conduit 109 directly with the interior of the low pressure section $C^2$ of the column C at a point spaced an appropriate distance from the top of such low pressure section. The valve structure 106, which may be called a bypass valve, is adapted to have the two chambers mentioned connected in communication with each other, and thus to connect the "Discharge" surge chamber 94 in free communication with the upper part of the column through the conduit 105, valve structure 106, and conduit 109. In the drawing the constant communication between the conduits 105 and 85 is indicated by the passage 107, and the communicability of the passage or chamber 107 with the conduit 109 is indicated by the valve 108. Other constructions suited to the functions mentioned may evidently be used.

The expansion engine 18 is provided, in the present particular apparatus, with valve gear adapted to permit the engine to operate with admission for a relatively short portion of its working stroke, or with admission for a considerably longer portion of its working stroke. As will later be explained more in detail, when cutoff is relatively late in the working stroke to provide said long admission, the valve structure 106 will prevent communication between the "Discharge" surge chamber 94 and the column through the conduit 109; and when communication between the "Discharge" surge chamber 94 and the column is effected by the appropriate adjustment of the valve structure 106, the expansion engine will be operated with admission for said relatively short portion of its working stroke.

Various means can be provided for effecting the desired changes in period of admission, as, for example, a cam opened admission valve as shown in the Samuel C. Collins application Serial No. 665,206, now Patent No. 2,607,322, the provision of selectively operable cams with different dwells, or cams one relatively adjustable with respect to the other. See also for example Ferguson 2,221,790, patented November 19, 1940. Or cam-follower rollers one or both cooperating with a cam depening on whether early or later cutoff is desired may be employed, as in the apparatus of the Paget Expansion Engine application which matured into Patent No. 2,678,028.

Only such air will flow through the evaporator-condenser as cannot pass through the expansion engine.

This generator can deliver oxygen at on the order of 50 pounds, or at a pressure suitable to cylinder charging, on the order of 2000 pounds. During 50-pound oxygen production, complete condensation of the fraction of air passing through the air course 63 of the evaporator-condenser 60 may conceivably be effected by the cold released by vaporization of leaving liquid oxygen, but if more air passes through this course than can be liquefied by the available cold provided by evaporation of liquid oxygen, at a pressure on the order of 50 p. s. i., in the course 62 of the evaporator-condenser 60, the excess unliquefied air will be condensed in the column.

The conduit 83, previously mentioned, leads to a valve device 110 which is adapted to be adjusted to effect a reduction on the order of 60 p. s. i. in the pressure of the fluid (nearly pure nitrogen—about 98% pure) which flows through it; and the downstream side of the valve device 110 is connected by a conduit 111 with the jacket 98 for the strainer 97; and the top of this jacket is connected by a conduit 112 with a jacket 113 for the liquid oxygen pump 95, there being a conduit 114 leading from the jacket 113 to a connection 115 through which the nearly pure nitrogen may be admitted to the top of the low pressure section $C^2$ of the double column C.

The column C as previously noted includes a high pressure chamber $C^1$ and a low pressure chamber $C^2$, and these are separated by a partition wall 123 which is provided with a plurality of depending heat exchange elements 124 open at their ends communicating with the interior of the low pressure section $C^2$ and closed at their bottom ends 125. An inclined annular wall 126 projects inwardly at the top of the high pressure section $C^1$ and underlies a substantial number of the depending heat exchange elements 124. The conduit 77 has its communication with the high pressure chamber $C^1$ of the double column, near the bottom of that chamber, at 128. Accordingly, liquid air and expanded air pass into the bottom of the high pressure chamber $C^1$ in a united stream. When the apparatus is operating to produce oxygen, substantially pure nitrogen (about 98% pure) drips from the heat exchanger elements 124, and a portion of it is collected in an annular trough 129 which is formed between the annular sloping wall 126 and the outer wall of the column. From this trough 129 the conduit 82 conducts the liquid nitrogen to the heat exchanger 24, and the nearly pure nitrogen passes through the course 24C of this heat exchanger and then passes through the conduit 83 and the valve device 110, and from the latter through the conduit 111 to the cooling coil or jacket 98 surrounding the strainer 97 for liquid oxygen. The cooling coil 98 is connected in series with the jacket 113 for the liquid oxygen pump, and from this jacket the conduit 114 leads to the connection 115 arranged at the top of the column's low pressure chamber $C^2$.

From the bottom of the high pressure chamber $C^1$ of the double column C, a conduit 140 leads to the course 24B of heat exchanger 24, and from this course the enriched air which is formed in the chamber of column section $C^1$ by a process of partial rectification therein is delivered through a conduit 141 to a valve device 110' whose other side is connected by a conduit 142 with the conduit 109 leading from the conduit 105 connected with the "Discharge" surge chamber 94 and also connected through the casing of the bypass valve structure 106 with the conduit 85 which is connected with the course 23C of the heat exchanger 23. The other end of the course 23C is connected with the conduit 86 which leads to the check valve 87 and to the conduit 88 which communicates with the conduit 77 at a point in the latter just beyond the valve device 76. The liquid oxygen pump 95 takes liquid oxygen from the column section $C^2$ via the conduit 100 and the strainer 97 and discharges it through the conduit 81 into the top of course 24A of heat exchanger 24 and the conduit 80, the course 23A of heat exchanger 23, conduit 79, oxygen course 62 of evaporator-condenser 60, conduit 65, course 22A of heat exchanger 22, conduit 33, and course 21A of heat exchanger 21, delivering the oxygen pumped by the oxygen pump 95 to the delivery conduit 25.

The valve devices 110 and 110' each control the flow of one of the fluids which originated in the high pressure chamber $C^1$ of the double column. They are therefore quite similar in construction and effect like reductions of pressure, herein approximately 75 p. s. i. One of them has the fluid passing from its downstream side into the low pressure section $C^2$ of the double column at a point somewhat lower in that section than the other, as will be noted. The nearly pure nitrogen passes through the conduit 82, through course 24C of heat exchanger 24, through conduit 83, through valve device 110, conduit 111, cooling coil 98, jacket 113, conduit 114, and through the connection 115 into the top of the upper section of the double column. The enriched air passes through the conduit 140, course 24B of exchanger 24, conduit 141, valve device 110', conduit 142, and conduit 109 into the column section $C^2$.

Rectification takes place in the manner common to double columns in the two compartments of column C. The nitrogen is nearly pure (98%) by reason of the rectification process which goes on in section C¹ when it leaves the latter. Enriched air that leaves the bottom of the column section C¹ contains from 40% to 50% oxygen. The pressure in the section C¹ may be between 75 and 85 p. s. i.; the pressure in the upper section C² from 5 to 10 p. s. i. The pure oxygen drawn off from the bottom of section C² may desirably be pumped at a pressure of approximately 50 p. s. i. through course 24A of exchanger 24, conduit 80, course 23A of exchanger 23, and conduit 79 into the oxygen course 62 of evaporator-condenser 60. At this pressure the saturation temperature of the oxygen will be just a little below the saturation temperature of the inflowing air, at 158 p. s. i. which is the pressure at this point. Accordingly there will be, with the quantity of compressed air which flows during low pressure, 50-pound oxygen production, to wit, 12% of the whole, as explained in the application of which this case is a continuation-in-part, vaporization of the leaving oxygen and at least substantially complete liquefaction of the air which passes through the evaporator-condenser 60. However, if complete liquefaction of this air does not occur, such liquefaction will take place in the high pressure section C¹ of the double column.

The pressure drop in the expansion engine and the pressure drop caused by the valve device 110', the pressure drop at the restrictor 51, and the pressure in the section C² of the column cumulatively amount to the pressure at which air is supplied to the system from the compressor—in this case 160 p. s. i. Likewise, in the parallel connection, the pressure drop across the restrictor 51, that across the valve device 76, that across the valve device 110 and the pressure in the low pressure section C² are cumulatively equal to the supply pressure.

It will be clear that there is conservation of refrigeration in a highly desirable manner. Compressed air at 158 p. s. i. may be condensed when the temperature is reduced to say 112° K. when brought into heat transfer relation, in the evaporator-condenser 60, with liquid oxygen at a pressure of 50 p. s. i. and a temperature of 107° K. By pumping the liquid oxygen from the column and increasing its pressure to the value given, and bringing it into heat transfer relation with the entering air in the evaporator-condenser 60, about 12% of the entering air can be liquefied, and during normal 50-pound oxygen production, the periods of admission of the expansion engine may be so predetermined that just about 12% of the entering air will not be capable of passing through the expansion engine and will be caused to flow through evaporator-condenser 60. If all this air is not liquefied in this evaporator-condenser, this will do no harm because the air will be later condensed.

Instead of using the valve devices 110 and 110' it is possible to employ positive displacement, mechanical metering devices 151 and 152 with mechanically opened valves. The use of these metering devices is the characteristic feature of the present invention. They are shown as alternative in use to the valve devices 110 and 110', though when in use they take the places of those valves and accordingly the latter might be omitted, though the metering devices and valves are shown as selectively alternatively usable. The device 151 is shown in a position to pass fluid in a path parallel with that controlled by the valve device 110 and has an inlet-valve-controlled intake connection 153 with the conduit 82 and a discharge-valve-controlled discharge conduit 154 communicating with the connection 111 between the valve device 110 and the cooling coil 98. The device 152 has an inlet-valve-controlled intake connection 156 connected with the conduit 141, and a discharge-valve-controlled discharge conduit 157 delivering to the conduit 109. Thus the device 152 is in a parallel circuit with the valve device 110'. The metering devices and the valve devices with which they are respectively in parallel will not be used concurrently, and the metering devices are to be regarded as alternatives for the valve devices. These metering devices will be made with displacements slightly greater than requisite to handle the maximum volumes of liquid which will pass through them from the respective points from which they take fluid. If they keep the liquid level down and tend to draw some vapor, the effect on the system will be very slight, because the volume of the vapor as compared with the volume of the liquid under similar pressure and temperature conditions will be so very large that little interference with the intended mode of operation of the apparatus will be possible. The valve devices 110 and 110' may be of such construction as to permit their being brought to and maintained in closed positions when the metering devices are to be employed, or they may have stop valves, as at 160 and 161, arranged to permit their being shut off from the associated conduits at their upstream sides. The metering devices, since they have valves—both intake and discharge—which, similarly to the valves of the expansion engine of Patent No. 2,607,322, require positive opening by associated valve gear when handling fluids at the pressures for which they are designed, do not require the provision of stop valves in their respective suction lines when not in use, but there may desirably be provided stop valves 163, associated with device 151, and 164, associated with device 152, for closing such lines when it is desired to control the system with the valve devices 110 and 110'. A further stop valve S may desirably be located in the conduit 82 beyond the connection of the latter with the valve 163. Other suitable types of inlet and discharge valves may be employed, in place of the valves of the type of Patent No. 2,607,322.

When the valve devices 110 and 110' are not being employed, but instead the positive displacement metering devices 151 and 152, it will be observed that the conduit 141 associated with device 152 constitutes a suction line communicating ultimately with the bottom of the high pressure section C¹ of the column C through the conduit 140, and the discharge line of the positive displacement device 152 communicates with the line 142 leading to the conduit 109. With this construction, the conduit 153 and a portion of the communicating conduit 82 constitute the intake line for the device 151, and the discharge line from this device is numbered 154. The devices 151 and 152 may have any suitable driving means. They are driven at constant speed and are of the positive displacement type. Their displacements at their operating speeds slightly exceed the maximum quantities of liquid which they may respectively be called upon to pass through them. If they are given a displacement even twice that of the maximum quantity of liquid which they are likely to have occasion to transfer, this would be all right, because the volume of the vapors of the uncondensed liquids is so very much greater than the volumes of the liquids, that there would be no danger of substantially upsetting the cycle. Nevertheless, the slight excess of displacement over the maximum volumes of liquid which may require displacement completely insures against possibility of either section of the column filling up with liquid and becoming logged. In an apparatus employing a single column, as shown in Fig. 1 of the parent of this application, the valve device providing for a predetermined reduction in pressure between the condenser in the bottom of the column and the point of discharge into the top of the column may also be replaced by a metering device having an appropriate constant mean displacement rate slightly exceeding the rate at which liquid becomes available in the condenser, said metering device located to handle liquid air and said metering device and said valve 110 each being suitably bypassed when not in use.

Other forms of dispensing devices may be used in place of the metering devices 151 and 152. The flow is from high pressure to low. It is therefore necessary to employ valve devices which cannot be opened by normally encountered fluid pressures. The provision of two valve devices (though their equivalent in a single valve device would suffice) is desirable in order that one valve may permit flow of fluid for a desired period into a chamber from which it is later to be dispensed to a lower pressure point, and in order that the other valve may determine the time of initiation and the duration of the dispensing to the lower pressure point. In Fig. 2 I have illustrated a suitable arrangement. This arrangement is shown as a dispensing device 165 including a transfer chamber 166 which valves 167 and 168 are respectively adapted to connect with a higher pressure line such as the line 82 or the line 141 and with a lower pressure line such as the line 154 or the line 142. The valves, normally closed by springs 169 and 170, are periodically opened and closed, as under the control of cam type devices including cams 171 and 172 turning at like angular rates and coacting with bell cranks 173 and 174 cooperating with valve stems 175 and 176. As such cam type mechanisms are obviously capable of assuming many forms in practice they need not be illustrated in detail here and are but diagrammatically shown. The valve opening devices open the valves and permit (as illustrated) their closure with the same frequency, but the valves are not both open at the same time. When one valve is open, the other is always closed. Ordinarily a discharge period longer than the supply period for the chamber may be desirable.

The chamber 166 may be varied in size. The larger it is, the less frequently any valve will have to be opened. If, however, the chambers are made too large, and the number of openings are made correspondingly lower, the performance of the column would suffer from the intermittency of feed. In any case, the size of the chamber and frequency of valve opening will be so chosen that the highest liquid flow normally encountered can take place. Generally the chamber will fill part way with liquid and the rest of its volume will be filled with vapor.

The discharge valve must be located in the lowermost wall of the chamber—in its floor—so that the liquid portion of the charge will be the first to escape from the chamber. The tendency of the liquid to "flash" (vaporize as soon as the pressure is relieved) will provide the necessary force to discharge the liquid provided the outlet is at the lowest point.

It will be understood that this pre-supposes that the saturation pressure of the liquid entering the chamber is greater than the pressure which exists in the passage to which the chamber is connected to discharge on opening of the outlet valve. If the liquid were so cold that its saturation pressure did not exceed the pressure in the discharge conduit, the chamber form of dispensing device just described would not be employed and resort would be had to displacement means such as the metering devices previously described.

While there are in this application specifically described one form which the invention may assume in practice, and certain modifications, it will be understood that these have been disclosed for purposes of illustration and that the invention may be modified and embodied in various other forms without departing from its spirit or the scope of the appended claims.

What is claimed is:

1. In an apparatus for the separation of gases by the liquefaction and rectification of a mixture thereof, in combination, at least one heat exchanger, an evaporator-condenser, said evaporator-condenser having an oxygen conducting course and an air conducting course in close heat exchange relation with each other, another heat exchanger, an expansion engine, a double column having high and low pressure chambers, a liquid oxygen pump, means for connecting said at least one heat exchanger to deliver air under pressure in divided streams to the air conducting course of said evaporator-condenser and to said expansion engine, means for delivering air exhausted from said expansion engine to the high pressure chamber of said column via said other heat exchanger, means including a valve device for delivering air from the air conducting course of said evaporator-condenser via said other heat exchanger to the high pressure chamber of the column at the same pressure as the exhaust from the expansion engine, means including constant displacement metering devices for delivering nearly pure nitrogen and enriched air from the high pressure chamber of the column to the low pressure chamber thereof, means for connecting said liquid oxygen pump with the low pressure chamber of said column at a point at the normal liquid oxygen level therein, and means for conducting the discharge from said liquid oxygen pump to the oxygen conducting course of said evaporator-condenser.

2. In an apparatus for the separation of gases by the liquefaction and rectification of a mixture thereof, in combination, at least one heat exchanger, an evaporator-condenser, said evaporator-condenser having an oxygen conducting course and an air conducting course in close heat exchange relation with each other, another heat exchanger, an expansion engine, a double column having high and low pressure chambers, a liquid oxygen pump, means for connecting said at least one heat exchanger to deliver air under pressure in divided streams to the air conducting course of said evaporator-condenser and to said expansion engine, means for delivering air exhausted from said expansion engine to the high pressure chamber of said column via said other heat exchanger, means including a valve device for delivering air from the air conducting course of said evaporator-condenser via said other heat exchanger to the high pressure chamber of the column at the same pressure as the exhaust from the expansion engine, means including constant speed, fixed displacement metering devices each of a capacity slightly greater than the maximum amount of liquid to be handled thereby, one individual to each conducting means, for delivering nearly pure nitrogen and enriched air from the high pressure chamber of the column to the low pressure chamber thereof, means for connecting said liquid oxygen pump with the low pressure chamber of said column at a point at the normal liquid oxygen level therein, and means for conducting the discharge from said liquid oxygen pump to the oxygen conducting course of said evaporator-condenser.

3. In an apparatus for the separation of gases by the liquefaction and rectification of a mixture thereof, in combination, at least one heat exchanger, an evaporator-condenser, said evaporator-condenser having an oxygen conducting course and an air conducting course in close heat exchange relation with each other, an expansion engine, a double column having high and low pressure chambers, a liquid oxygen pump, means for connecting said at least one heat exchanger to deliver air under pressure in divided streams to the air conducting course of said evaporator-condenser and to said expansion engine, means for delivering air exhausted from said expansion engine to said high pressure chamber, means including a valve device for delivering air from the air conducting course of said evaporator-condenser at a reduced pressure to said high pressure chamber, means including constant speed, fixed displacement metering devices for effecting the delivery of fluids from said high pressure chamber to said low pressure chamber, means for connecting said liquid oxygen pump with said low pressure chamber at a point at the normal liquid oxygen level therein, and means for conducting the discharge from said liquid oxygen pump to the oxygen conducting course of said evaporator-condenser.

4. In an apparatus for the separation of gases by the liquefaction and rectification of a mixture thereof, in combination, at least one heat exchanger, an evaporator-condenser, said evaporator-condenser having an oxygen conducting course and an air conducting course in close heat exchange relation with each other, another heat exchanger, an expansion engine, a double column having high and low pressure chambers, a liquid oxygen pump, means for connecting said at least one heat exchanger to deliver air under pressure in divided streams to the air conducting course of said evaporator-condenser and to said expansion engine, means for delivering air exhausted from said expansion engine to the high pressure chamber of said column via said other heat exchanger, means including a valve device for delivering air from the air conducting course of said evaporator-condenser via said other heat exchanger to the high pressure chamber of the column at the same pressure as the exhaust from the expansion engine, means including dispensing devices, each including a chamber of fixed volume, an inlet valve, a discharge valve and means for opening said valves and controlling the closing thereof precluding their being open simultaneously, for delivering nearly pure nitrogen and enriched air from the high pressure chamber of the column to the low pressure chamber thereof, means for connecting said liquid oxygen pump with the low pressure chamber of said column at a point at the normal liquid oxygen level therein, and means for conducting the discharge from said liquid oxygen pump to the oxygen conducting course of said evaporator-condenser.

5. In an apparatus for the separation of gases by the liquefaction and rectification of a mixture thereof, in combination, at least one heat exchanger, an evaporator-condenser, said evaporator-condenser having an oxygen conducting course and an air conducting course in close heat exchange relation with each other, an expansion engine, a double column having high and low pressure chambers, means for connecting said at least one heat exchanger to deliver air under pressure in divided streams to the air conducting course of said evaporator-condenser and to said expansion engine, means for delivering air exhausted from said expansion engine to said high pressure chamber, means including a valve device for delivering air from the air conducting course of said evaporator-condenser, at a pressure less than the pressure in the air conducting course of said evaporator-condenser and essentially the same as the pressure at which air is exhausted from said expansion engine, to said high pressure chamber, means including constant speed, fixed displacement metering devices for effecting the delivery of fluids from said high pressure chamber to said low pressure chamber, and means for effecting the transmission of liquid oxygen from said low pressure chamber to the oxygen conducting course of said evaporator-condenser.

References Cited in the file of this patent

UNITED STATES PATENTS

| | | |
|---|---|---|
| 2,552,451 | Patterson | May 8, 1951 |
| 2,588,656 | Paget | Mar. 11, 1952 |